(12) United States Patent
Chavrier et al.

(10) Patent No.: US 12,240,437 B2
(45) Date of Patent: Mar. 4, 2025

(54) METHOD FOR OPERATING A VEHICLE AND VEHICLE OPERATED BY SUCH A METHOD

(71) Applicant: Volvo Truck Corporation, Gothenburg (SE)

(72) Inventors: Philemon Chavrier, Lyons (FR); Renaud Laperriere, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/596,920

(22) Filed: Mar. 6, 2024

(65) Prior Publication Data
US 2024/0300471 A1   Sep. 12, 2024

(30) Foreign Application Priority Data
Mar. 9, 2023   (EP) .................................. 23160967.8

(51) Int. Cl.
| | | |
|---|---|---|
| *B60W 10/06* | (2006.01) | |
| *B60W 10/10* | (2012.01) | |
| *G05D 1/69* | (2024.01) | |
| *G07C 5/00* | (2006.01) | |

(52) U.S. Cl.
CPC ............ *B60W 10/06* (2013.01); *B60W 10/10* (2013.01); *G05D 1/69* (2024.01); *G07C 5/008* (2013.01); *B60W 2540/043* (2020.02); *B60W 2556/10* (2020.02); *B60W 2556/45* (2020.02);
(Continued)

(58) Field of Classification Search
CPC .. B60W 10/06; B60W 10/10; B60W 2556/45; B60W 2710/0627; B60W 2720/10; B60W 30/1882; B60W 30/1884; B60W 2710/1005; B60W 2556/10;
(Continued)

(56) References Cited

U.S. PATENT DOCUMENTS

| | | | |
|---|---|---|---|
| 2012/0197501 A1* | 8/2012 | Sujan ................ | B60W 30/1882 701/1 |
| 2014/0032062 A1 | 1/2014 | Baer et al. | |
| 2015/0134226 A1 | 5/2015 | Palmer et al. | |

(Continued)

FOREIGN PATENT DOCUMENTS

| | | |
|---|---|---|
| EP | 1170493 A2 | 1/2002 |
| EP | 1170493 A3 | 7/2004 |

(Continued)

OTHER PUBLICATIONS

European Search Report, European Application No. 23160967.8, mailed Jul. 31, 2023, 9 pages.

*Primary Examiner* — Roger L Pang
(74) *Attorney, Agent, or Firm* — Sage Patent Group

(57) ABSTRACT

A method for operating a main vehicle along a trajectory, the vehicle belonging to a fleet of vehicles, the main vehicle including a powertrain controlled by a control unit. To diminish the consumption of the vehicle, the method includes analyzing, by an external server, consumption data of each vehicles of the fleet of vehicles having previously travelled on said trajectory; based on the analyzed consumption data, identifying, by the external server, an improvable-consumption section of the trajectory; and providing to the control unit from the external server with instructions to restrict consumption of the powertrain on the improvable-consumption section.

15 Claims, 2 Drawing Sheets

(52) U.S. Cl.
CPC ............... *B60W 2710/0627* (2013.01); *B60W 2710/1005* (2013.01); *B60W 2720/10* (2013.01)

(58) Field of Classification Search
CPC ......... B60W 2556/50; B60W 2556/65; B60W 2540/043; B60W 2540/30; G05D 1/69; G07C 5/008
USPC .......................... 701/54, 103, 104, 123, 29.3
See application file for complete search history.

(56) References Cited

U.S. PATENT DOCUMENTS

| | | | |
|---|---|---|---|
| 2015/0329102 A1* | 11/2015 | Yoshikawa | B60W 10/06 701/1 |
| 2018/0065485 A1* | 3/2018 | Koebler | G01C 21/3617 |
| 2018/0345885 A1 | 12/2018 | Seger et al. | |
| 2019/0375407 A1 | 12/2019 | Maleki et al. | |
| 2020/0055525 A1 | 2/2020 | Zeng et al. | |
| 2020/0122736 A1* | 4/2020 | Willis | G07C 5/02 |
| 2021/0302183 A1 | 9/2021 | Mendes et al. | |
| 2022/0244061 A1 | 8/2022 | Mellinger et al. | |

FOREIGN PATENT DOCUMENTS

| | | | |
|---|---|---|---|
| EP | 2878509 A2 | 3/2015 | |
| EP | 2878509 A3 | 7/2016 | |

* cited by examiner

METHOD FOR OPERATING A VEHICLE AND VEHICLE OPERATED BY SUCH A METHOD

CROSS REFERENCE TO RELATED APPLICATIONS

This application claims priority to European Patent Application No. 23160967.8, filed on Mar. 9, 2023, the disclosure and content of which is incorporated by reference herein in its entirety.

TECHNICAL FIELD

The disclosure relates generally to vehicles. In particular aspects, the disclosure relates to a method for operating a vehicle and vehicle operated by such a method. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

It is known to coach a vehicle's driver to improve the performance of the vehicle. Typically, the vehicle's performance along a trajectory is recorded and analyzed in order to provide advices to the driver, to improve its driving and, consequently, the performance of the vehicle.

However, the effectiveness of such coaching methods depends on the willingness of drivers to improve their driving, which limits the potential of these methods, especially when drivers are reluctant to change their driving habits.

There is therefore a need for methods to improve the performance of a vehicle when its driver is not driving optimally, regardless of the driver's intention.

SUMMARY

According to a first aspect of the disclosure, the disclosure relates to a method for operating a main vehicle along a trajectory, the vehicle belonging to a fleet of vehicles, the main vehicle comprising a powertrain controlled by a control unit. The method comprises:
  Analyzing, by an external server, consumption data of each vehicle of the fleet of vehicles having previously travelled on said trajectory;
  based on the analyzed consumption data, identifying, by the external server, an improvable-consumption section of the trajectory; and
  providing to the control unit from the external server with instructions to restrict consumption of the powertrain on the improvable-consumption section.

The first aspect of the disclosure may seek to improve the efficiency of the main vehicle. A technical benefit may include reducing the consumption of the main vehicle only on a segment of its trajectory where the consumption would be high.

In some examples, including in at least one preferred example, optionally the method further comprises, prior to analyzing the consumption data of each vehicles of the fleet of vehicles, collecting consumption data of each vehicles of the fleet of vehicles travelling on said trajectory; and transmitting collected data to the external server. A technical benefit may include decentralizing the analysis of the consumption data, and facilitating the sharing of the data between the vehicles of the fleet of vehicles.

In some examples, including in at least one preferred example, optionally identifying the improvable-consumption section is performed by measuring the difference in consumption along the trajectory between the vehicles of the fleet having the highest consumption and the vehicles of the fleet having the lowest consumption, and by determining on which section of the trajectory said difference is greater than a predetermined threshold, said section being the improvable-consumption section. A technical benefit may include restricting the performances of the main vehicle only when the resulting consumption gain is potentially high.

In some examples, including in at least one preferred example, optionally the method further comprises identifying, by the control unit, a driver of the main vehicle; analyzing, by the external server, individual performances of the driver of the main vehicle; and comparing, by the external server, individual performance of the driver of the main vehicle with individual performance of drivers of other vehicles of the fleet. Furthermore, the external server provides to the control unit instructions to restrict the consumption of the powertrain only when performance of the driver is inferior to that of drivers of other vehicles of the fleet. A technical benefit may be avoiding to restrict the main vehicle's performance when the driver's performance is sufficient to make such a restriction unnecessary.

In some examples, including in at least one preferred example, optionally the driver of the main vehicle is identified through identification data provided by a navigation system of the main vehicle. A technical benefit may include making the identification of the driver reliable.

In some examples, including in at least one preferred example, optionally the method further comprises acting on the powertrain by the control unit implementing said instructions on the improvable-consumption section to restrict consumption of the powertrain. A technical benefit may include diminishing consumption of the main vehicle.

In some examples, including in at least one preferred example, optionally acting on the powertrain includes restricting a maximum speed achievable by the main vehicle on the improvable-consumption section. A technical benefit may include restricting the performance of the main vehicle in a safe manner, since the reduction of the maximum speed has no effect on the behavior of the vehicle below this maximum speed.

In some examples, including in at least one preferred example, optionally the powertrain comprises an internal combustion engine, and restricting the maximum speed achievable by the main vehicle is achieved by the control unit restricting a maximum flow of fuel injectable into the internal combustion engine. A technical benefit may include safely and reliably reducing the maximum speed achievable by the main vehicle.

In some examples, including in at least one preferred example, optionally the powertrain comprises an automatic transmission, and wherein acting on the powertrain includes restricting the gear ratios of the automatic transmission that can be used on the improvable-consumption section. A technical benefit may include improving the efficiency of the main vehicle by allowing the vehicle to operate only on the most efficient gear ratios of the automatic transmission.

In some examples, including in at least one preferred example, optionally the control unit restricts the gear ratios of the automatic transmission that can be used on the improvable-consumption section at least by restricting the lower ratio of the automatic transmission that can be used, to avoid an engine of the main vehicle to over speed, and/or restricting the higher ratio of the automatic transmission that can be used, to avoid the engine of the main vehicle to under speed. A technical benefit may include improving the efficiency of the main vehicle by allowing the vehicle to operate only on the most efficient gear ratios of the automatic transmission.

In some examples, including in at least one preferred example, optionally acting on the powertrain includes modifying a control law of an acceleration pedal of the main vehicle on the improvable-consumption section. A technical benefit may include reducing the maximum speed achievable by the main vehicle and simultaneously preventing excessive accelerating that could reduce in overconsumption.

According to another aspect of the disclosure, the disclosure relates to a vehicle comprising a control unit and a powertrain, wherein the control unit is configured to carrying out acting on the powertrain of the method described here above. The second aspect of the disclosure may seek to improve the efficiency of the vehicle. A technical benefit may include reducing the consumption of the main vehicle only on a segment of its trajectory where the consumption would be high.

In some examples, including in at least one preferred example, optionally the vehicle is a heavy-duty vehicle, preferably a truck. A technical benefit may include improving the efficiency of heavy-duty vehicles and diminishing the cost of operating such heavy-duty vehicles.

According to another aspect of the disclosure, the disclosure relates to a system comprising an external server and the vehicle described here above, wherein the external server and the control unit are configured to perform the method described here above.

In some examples, including in at least one preferred example, optionally the system further comprises a fleet of vehicles to which belongs the vehicle.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
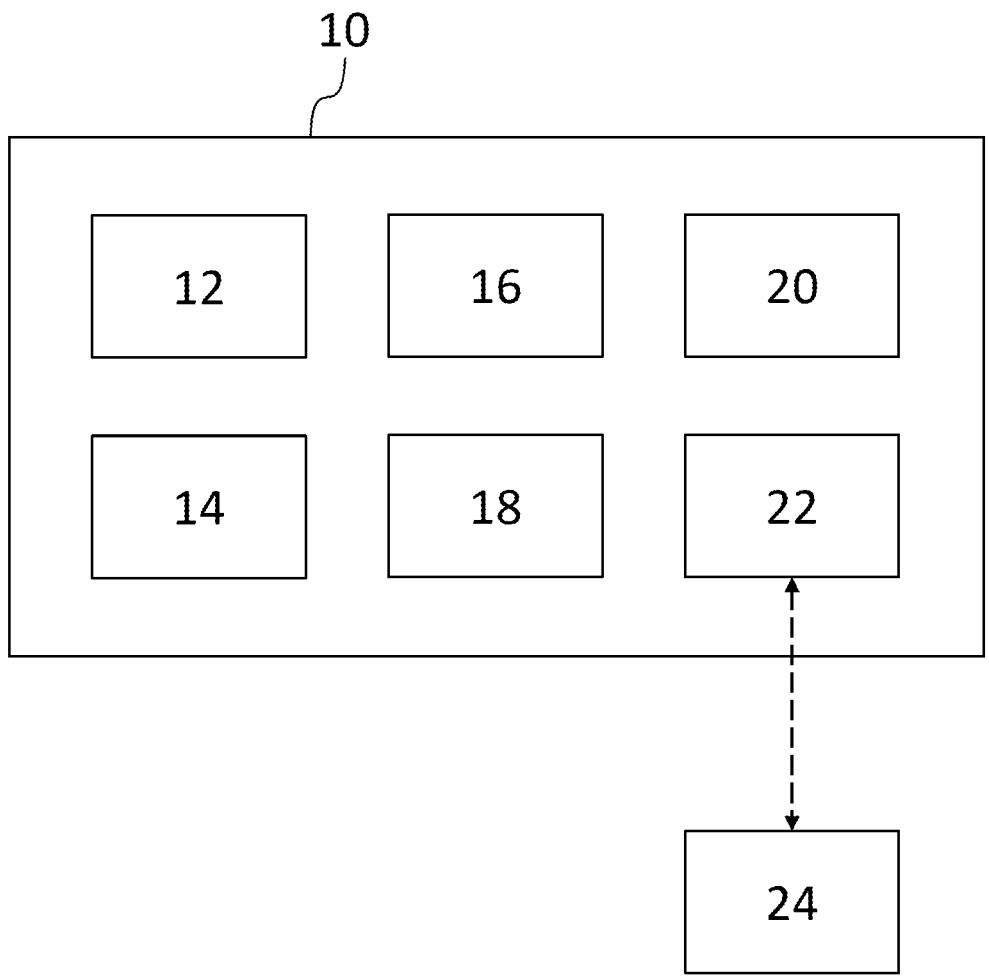
FIG. 1 is an exemplary system diagram of a vehicle according to an example.

A vehicle 10 according to an example is shown in the exemplary diagram of FIG. 1. The vehicle 10 is for example a heavy-duty vehicle, preferably a truck. The vehicle 10 is driven by a driver, not shown.

The vehicle belongs to a fleet of vehicles, not represented. The fleet of vehicles comprises several vehicles. The vehicle 10 is distinguished from other vehicles in the fleet by being referred to as the "main vehicle". Preferably, all the vehicles of the fleet, including the vehicle 10, are similar vehicles, that is, vehicles having a similar weight and similar performances. Preferably, all the vehicles of the fleet are trucks.

Therefore, the following description of the vehicle 10 is applicable to all other vehicles of the fleet of vehicles.

The vehicle 10 comprises a control unit 12, which control the operation of the vehicle.

The vehicle 10 comprises a powertrain comprising an engine 14 and a transmission 16.

The engine 14 is, in the example, an internal combustion engine. Therefore, in the example, the vehicle 10 consumes fuel, such as gasoline or diesel, to run the engine 14.

The transmission 16, also called a gearbox, comprises multiple gear ratios. In the example, the transmission 16 is an automatic transmission, and automatically select the gear ratio best suited to optimize the vehicle's performance based mainly on the speed of the vehicle and the load on the engine 14. Preferably, the transmission 16 is controlled by the control unit 12. In a manner known per se, the driver of the vehicle 10 can manually select a gear ratio of the transmission 16, for example to allow the vehicle to benefit from more torque by selecting a lower ratio than the ratio that would be automatically selected by the transmission 16. As an alternative, the transmission 16 can be a manual transmission.

The vehicle 10 comprises an acceleration pedal 18, which allows the driver to control the acceleration of the vehicle.

The vehicle 10 comprises a navigation system 20, which includes several functions. In the example, the navigation system 20 comprises a tachograph, which records the vehicle's speed and distance travelled, and which is able to identify the vehicle's driver. For example, the driver is identified by the tachograph with an identification card. In the example, the navigation system 20 also comprises a satellite-based positioning system, such as a Global Positioning System (GPS), which is able to record the trajectory on which the vehicle 10 is travelling. In the example, the navigation system 20 also comprises a fuel consumption meter, which is recording the quantity of fuel consumed by the vehicle along the travelled trajectory.

The vehicle 10 comprises a communication device 22, which is configured to communicate with an external server 24, distinct from the vehicle 10. For example, the communication device 22 communicates with the external server 24 through a cellular network, or through a satellite communication.

Figure 2:
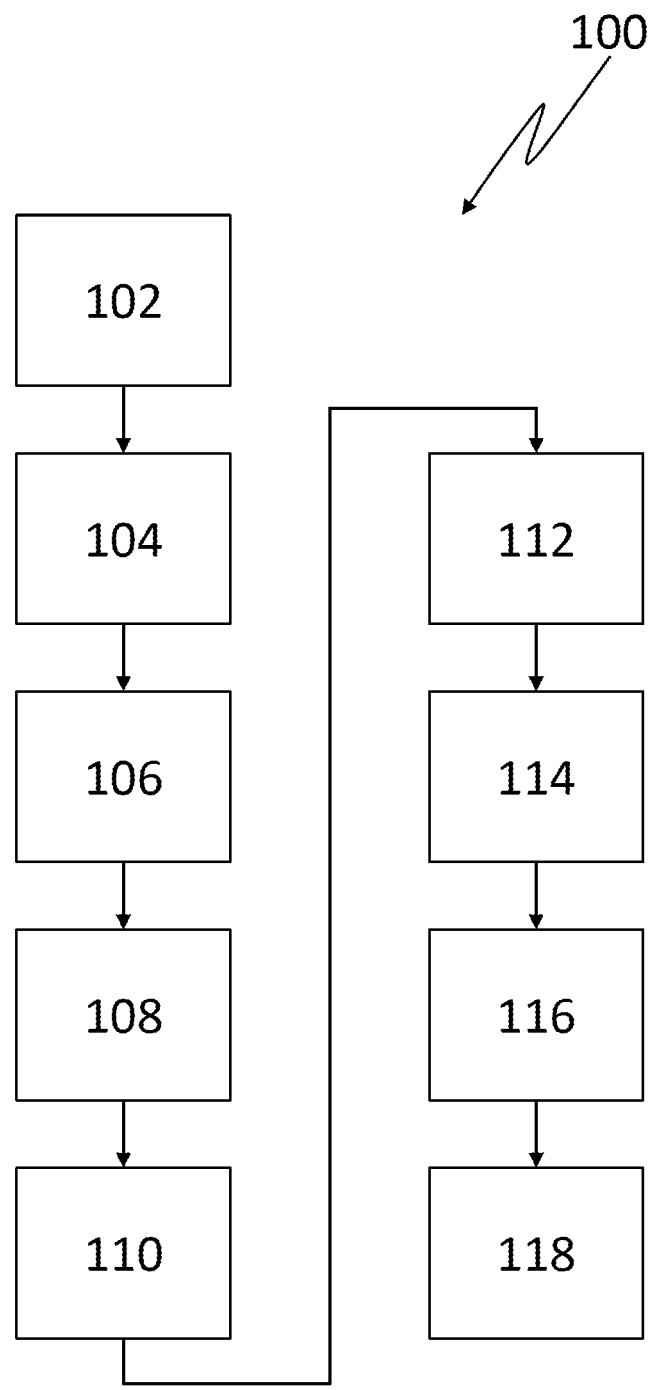
FIG. 2 is an exemplary flowchart of a method according to an example for operating the vehicle of FIG. 1.

With reference to FIG. 2, a method 100 for operating the vehicle 10 along a predetermined trajectory is now described. The method 100 is described in relation to the vehicle 10, but can be used to control all the vehicles in the fleet of vehicles.

The method 100 is used to decrease the fuel consumption of the powertrain of vehicle 10 when the vehicle is travelling along the trajectory, by comparing the performance of the vehicle 10 to the performance of the other vehicles of the fleet of vehicles. Hereafter the fuel consumption of the powertrain is also referred to as the consumption of the vehicle, for sake of simplicity.

The control unit 12 is preferably a control unit dedicated to the performing of some of the steps of the method 100 as described below, which is also interacting with a main control unit of the vehicle. Alternatively, the control unit is the main control unit of the vehicle 10, which is performing other tasks during the operation of the vehicle.

The method 100 comprises a collecting step 102, during which consumption data of each vehicles of the fleet travelling on the predetermined trajectory are collected. In the example, the consumption data are fuel consumption data. Practically speaking, the control unit 12 of each vehicle of the fleet travelling along said trajectory records the quantity of fuel consumed by said vehicle along each section of the trajectory.

Then, the method 100 comprises a transmitting step 104 during which the collected consumption data of each vehicle of the fleet having travelled along the trajectory are transmitted to the external server 24 by the communication device 22 of each vehicle.

Then, the method 100 comprises a consumption-analyzing step 106, during which the consumption data of each vehicles of the fleet of vehicles having previously travelled on said trajectory, and having send their consumption data to the external server 24 during the transmitting step 104, are analyzed. Preferably, this analysis is performed by the external server. Preferably, the analysis performed comprises comparing the consumption data of all the vehicles of the fleet having travelled on the trajectory between them.

Then, the method 100 comprises a section-identifying step 108, during which a section of the trajectory on which the consumption of the vehicles of the fleet may be improved is identified. This section may therefore be designated as an "improvable-consumption section". Preferably, this identification is performed by measuring the difference in consumption between the vehicles of the fleet of vehicles with the highest and lowest consumption, and said section corresponds to a section of the trajectory of which said difference is the greatest. In other words, based on the consumption data of the fleet of vehicles, the section, or sections, on which the difference in consumption between vehicles is the greatest, that is, on which the variability of consumption is high, are identified as sections on which the consumption of the vehicles having the highest consumption has the greatest potential for improvement. This step is performed by the external server 24.

It is to be understood that the identifying step 108 is performed on a fleet-wide basis and is therefore not necessarily associated with a specific vehicle, such as the main vehicle 10. Indeed, this step makes it possible to know on which sections of the trajectory the gains in consumption can be the most important, but not for which vehicles of the fleet these gains are achievable.

To detect if significant consumption gains can be achieve for a specific vehicle, in the example for the main vehicle 10, the method 100 comprises a driver-identifying step 110, during which the driver of the vehicle 10 is identified by the control unit 12, for example thanks to the tachograph of the navigation system 20. This step allows associating consumption data of the vehicle with a specific driver.

Then, the method 100 comprises a driver-analyzing step 112, during which the individual performances of the identified driver are analyzed by the external server 24, based on consumption data collected during previous travels of the identified driver driving vehicle 10 and/or other vehicles of the fleet.

Then, the method 100 comprises a comparing step 114, during which individual performance of the identified driver of the vehicle 10 are compared by the external server 24 with individual performance of other drivers of the fleet, that is, of drivers having previously driven vehicle 10 and/or other vehicles of the fleet, and for which the consumption data were recorded and analyzed.

Practically speaking, to perform this comparison, the consumption data of each vehicles of the fleet are correlated to the corresponding drivers, so that a profile is created for each driver, said profile including all consumption data of the vehicles of the fleet driven by said driver. Then, the profile of all drivers are compared together.

This comparison makes it possible to detect drivers associated with vehicles with high average fuel consumption, said drivers having therefore performance inferior to that of drivers of other vehicles of the fleet, and other drivers associated with vehicles with low average fuel consumption, said drivers having therefore performance superior to that of drivers of other vehicles of the fleet.

Based on this comparison, if the driver of the vehicle 10 is detected to be a driver with inferior performance compared to other drivers of the fleet, it is concluded that the consumption of vehicle 10 of the identified section of the trajectory can be improved.

In this case, the method then comprises a providing step 116, during which the external server 24 provides to the control unit instructions to restrict consumption of the powertrain on the identified section.

Then, the method comprises an acting step 118, during which the control unit 12, implementing said instructions on the improvable-consumption section, acts on the powertrain to restrict consumption of the powertrain, and hence, of the vehicle 10.

On the contrary, if the driver is found to be performing better than other drivers of the fleet of vehicles, it is preferably concluded that there is no need to restrict the performance of vehicle 10, as little or no gain in consumption of vehicle 10 can be expected.

Preferably, the consumption of the powertrain are restricted by the control unit at least by reducing a maximum speed achievable by the main vehicle on the identified section. For example, the reduction of the maximum speed achievable by the main vehicle is achieved by reducing a maximum flow of fuel injectable into the internal combustion engine 14. To this end, the control unit 12 may adapt the control law of injectors of the vehicle 10. This prevents the driver from driving the vehicle 10 too fast, and therefore from consuming more fuel due to speeding.

Alternatively, or in addition, the fuel consumption of the powertrain are restricted by the control unit 12 at least by restricting the gear ratios of the automatic transmission 16 that can be used on the identified section. For example, the consumption of the powertrain are restricted at least by restricting the lower ratio of the automatic transmission that can be used, to avoid the engine 14 to over speed, and/or restricting the higher ratio of the automatic transmission that can be used, to avoid the engine to under speed. This prevents the driver from manually selecting a gear ration that would lead to excessive fuel consumption.

Alternatively, or in addition, the consumption of the powertrain are restricted by the control unit at least by modifying the control law of the acceleration pedal 18 on the identified section. This prevents the driver from driving in an aggressive manner, with strong acceleration leading to high fuel consumption.

The fact that the acting step 118 is performed by the control unit 12 is particularly advantageous, as the external server 24 does not intervene in the restriction of performance of the vehicle 10, which improves the reliability of this restriction, and avoid safety issues, which may result, for example, from connection issues between the communication device 22 and the external server 24.

The method 100 described here above is particularly advantageous to diminish the fuel consumption of the fleet of vehicles, by identifying the vehicles of the fleet for which the potential gain in consumption is the highest, based on previous vehicle consumption data and on the fleet's drivers performance, and by restricting the performance only of identified vehicles.

The method 100 is particularly useful for a fleet of vehicles that regularly follow the same trajectory, such as, for example, a fleet of delivery vehicles. Indeed, the regular use of the same trajectory provides a large amount of data for an accurate analysis of vehicle and driver performance.

According to another example, the method 100 does not comprise steps 102 and 104. In other words, consumption data of the fleet of vehicles along the trajectory are not collected and analyzed to identify the section of the trajectory on which the performance of vehicle 10 are to be improved. In this example, during step 106, consumption data of the vehicles of the fleet may be estimated based on a theoretical model, or computer model, of the vehicles operation and topographic data of the trajectory. In other words, in this example, the analysis of step 106 is based of theoretical consumption data of each vehicles of the fleet along the trajectory, these vehicles having virtually travelled along said trajectory in the theoretical or computer model.

According to another example, the section of the trajectory on which the performance of vehicle 10 are to be improved is also identified by taking into account data other than consumption data, for example data based on noise-regulation areas, to force vehicles of the fleet to emit less noise by restricting their performance in said areas, on the topography of the trajectory, for example to restrict the performance of the vehicle in dangerous section, as mountainous roads, or on the time of day that vehicles travel along the trajectory. Other identification methods can be considered.

According to another example, the method 100 does not comprise steps 110, 112 and 114. In other words, during steps 116 and 118, consumption of all vehicles are restricted by their respective control units 12 on the identified section, regardless of the individual performance of the corresponding drivers.

According to another example, the method 100 is not applied at the level of the vehicle fleet, but only at the level of vehicle 10. This equates to the fleet comprising only the vehicle 10. In this example, consumption data of vehicle 10 are collected over multiple travel along the trajectory, and analyzed to identify on which section of the trajectory the consumption of vehicle 10 is the highest.

According to another example, the engine 14 is not an internal combustion engine, but an electric motor. In this example, the vehicle 10 is therefore an electric vehicle. In this example, the vehicle 10 may not comprises a transmission 16. In this example, the vehicle 10 does not consumes fuel to propel the engine 14, but electricity, which is for example provided by a battery. Hence, the consumption of the vehicle 10 corresponds to the quantity of electrical power consumed to propel the vehicle.

According to another example, the navigation system 20 and/or the communication device 22 are integrated into the control unit 12.

According to another example, during the identifying step 108, multiple improvable-consumption sections of the trajectory are identified by the external server, and during the acting step 118, the consumption of the powertrain is restricted by the control unit 12 on all the identified sections. This example is particularly advantageous when there is multiple distinct sections along the trajectory on which the variability of consumption of the vehicles of the fleet is high.

Example 1: a method 100 for operating a main vehicle 10 along a trajectory, the main vehicle belonging to a fleet of vehicles, the main vehicle comprising a powertrain 14, 16 controlled by a control unit 12, wherein the method 100 comprises:
  analyzing 106, by an external server 24, consumption data of each vehicles of the fleet of vehicles having previously travelled on said trajectory;
  based on the analyzed consumption data, identifying 108, by the external server, an improvable-consumption section of the trajectory; and
  providing 116 to the control unit from the external server with instructions to restrict consumption of the powertrain on the improvable-consumption section.

Example 2: the method 100 of example 1, further comprising, prior to analyzing 106 the consumption data of each vehicles of the fleet of vehicles:
  collecting 102 consumption data of each vehicles of the fleet of vehicles having previously travelled on said trajectory; and
  transmitting 104 collected data to the external server 24.

Example 3: the method 100 of either one of examples 1 and 2, wherein identifying 108 the improvable-consumption section is performed by measuring the difference in consumption along the trajectory between the vehicles of the fleet having the highest consumption and the vehicles of the fleet having the lowest consumption, and by determining on which section of the trajectory said difference is greater than a predetermined threshold, said section being the improvable-consumption section.

Example 4: the method 100 of any one of examples 1 to 3, further comprising:
  identifying 110, by the control unit 12, a driver of the main vehicle 10;
  analyzing 112, by the external server 24, individual performances of the driver of the main vehicle; and
  comparing 114, by the external server 24, individual performance of the driver of the main vehicle with individual performance of drivers of other vehicles of the fleet,
wherein the external server provides to the control unit 12 instructions to restrict the consumption of the powertrain 14, 16 only when performance of the driver is inferior to that of drivers of other vehicles of the fleet.

Example 5: the method 100 of example 4, wherein the driver of the main vehicle 10 is identified through identification data provided by a navigation system 20 of the main vehicle.

Example 6: the method 100 of any one of examples 1 to 5, further comprising acting 118 on the powertrain 14, 16 by the control unit 12 implementing said instructions on the improvable-consumption section to restrict consumption of the powertrain 14, 16.

Example 7: the method 100 of example 6, wherein acting 118 on the powertrain 14, 16 includes restricting a maximum speed achievable by the main vehicle 10 on the improvable-consumption section.

Example 8: the method 100 of example 7, wherein the powertrain 14, 16 comprises an internal combustion engine 14, and wherein restricting the maximum speed achievable by the main vehicle is achieved by the control unit 12 restricting a maximum flow of fuel injectable into the internal combustion engine.

Example 9: the method 100 of any one of examples 6 to 8, wherein the powertrain 14, 16 comprises an automatic transmission 16, and wherein acting 118 on the powertrain 14, 16 includes restricting the gear ratios of the automatic transmission that can be used on the improvable-consumption section.

Example 10: the method 100 of example 9, wherein the control unit 12 restricts the gear ratios of the automatic transmission 16 that can be used on the improvable-consumption section at least by:
  restricting the lower ratio of the automatic transmission that can be used, to avoid an engine 14 of the main vehicle to over speed, and/or
  restricting the higher ratio of the automatic transmission that can be used, to avoid the engine of the main vehicle to under speed.

Example 11: the method 100 of any one of examples 6 to 10, wherein acting 118 on the powertrain 14, 16 includes modifying a control law of an acceleration pedal 18 of the main vehicle 10 on the improvable-consumption section.

Example 12: a vehicle 10 comprising a control unit 12 and a powertrain 14, 16, wherein the control unit 12 is configured to carrying out acting 118 on the powertrain of the method of any one of examples 6 to 11.

Example 13: the vehicle 10 of example 12, wherein the vehicle 10 is a heavy-duty vehicle, preferably a truck.

Example 14: a system comprising an external server 24 and the vehicle 10 of either one of examples 12 and 13, wherein the external server 24 and the control unit 12 are configured to perform the method of any one of examples 1 to 11.

Example 15: the system according to example 14, further comprising a fleet of vehicle to which belongs the vehicle 10.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A method for operating a main vehicle along a trajectory, the main vehicle belonging to a fleet of vehicles, the main vehicle comprising a powertrain controlled by a control unit, the method comprising:
  analyzing, by an external server, consumption data of each vehicle of the fleet of vehicles having previously travelled on said trajectory;
  based on the analyzed consumption data, identifying, by the external server, an improvable-consumption section of the trajectory, wherein identifying the improvable-consumption section comprises measuring the difference in consumption along the trajectory between the vehicles of the fleet having the highest consumption and the vehicles of the fleet having the lowest consumption, and determining on which section of the trajectory said difference is greater than a predetermined threshold, said section being the improvable-consumption section; and
  providing to the control unit from the external server with instructions to restrict consumption of the powertrain on the improvable-consumption section.

2. The method of claim 1, further comprising, prior to analyzing the consumption data of each vehicles of the fleet of vehicles:
  collecting consumption data of each vehicles of the fleet of vehicles travelling on said trajectory; and
  transmitting collected data to the external server.

3. The method of claim 1, further comprising:
  identifying, by the control unit, a driver of the main vehicle;
  analyzing, by the external server, individual performances of the driver of the main vehicle; and
  comparing, by the external server, individual performance of the driver of the main vehicle with individual performance of drivers of other vehicles of the fleet,
  wherein the external server provides to the control unit instructions to restrict the consumption of the powertrain only when performance of the driver is inferior to that of drivers of other vehicles of the fleet.

4. The method of claim 3, wherein the driver of the main vehicle is identified through identification data provided by a navigation system of the main vehicle.

5. The method of claim 1, further comprising acting on the powertrain by the control unit implementing said instructions on the improvable-consumption section to restrict consumption of the powertrain.

6. The method of claim 5, wherein acting on the powertrain includes restricting a maximum speed achievable by the main vehicle on the improvable-consumption section.

7. The method of claim 6, wherein the powertrain comprises an internal combustion engine, and wherein restricting the maximum speed achievable by the main vehicle is achieved by the control unit restricting a maximum flow of fuel injectable into the internal combustion engine.

8. The method of claim 5, wherein the powertrain comprises an automatic transmission, and wherein acting on the powertrain includes restricting the gear ratios of the automatic transmission that can be used on the improvable-consumption section.

9. The method of claim 8, wherein the control unit restricts the gear ratios of the automatic transmission that can be used on the improvable-consumption section at least by:
restricting the lower ratio of the automatic transmission that can be used, to avoid an engine of the main vehicle to over speed, and/or
restricting the higher ratio of the automatic transmission that can be used, to avoid the engine of the main vehicle to under speed.

10. The method of claim 5, wherein acting on the powertrain includes modifying a control law of an acceleration pedal of the main vehicle on the improvable-consumption section.

11. A vehicle comprising a control unit and a powertrain, wherein the control unit is configured to carrying out acting on the powertrain of the method of claim 6.

12. The vehicle of claim 11, wherein the vehicle is a heavy-duty vehicle.

13. A system comprising an external server and a vehicle comprising a control unit and a powertrain, wherein the external server and the control unit are configured to perform the method of claim 1.

14. The system according to claim 13, further comprising a plurality of vehicles comprising the vehicle.

15. The vehicle of claim 12, wherein the vehicle is a truck.

* * * * *